United States Patent [19]

Schnaus et al.

[11] Patent Number: 5,269,348
[45] Date of Patent: Dec. 14, 1993

[54] DISTRIBUTOR FOR VISCOUS FLUIDS WITH ADJUSTABLE MULTIPLE DISCHARGE

[75] Inventors: Walter Schnaus, Rodenbach; Ferdinand Finkeldei, Frankfurt am Main; Dieter Cermak, Friedrichsdorf; Walter Metzger, Maintal, all of Fed. Rep. of Germany

[73] Assignee: Zimmer Aktiengesellschaft, Frankfurt, Fed. Rep. of Germany

[21] Appl. No.: 30,645

[22] Filed: Mar. 12, 1993

[51] Int. Cl.⁵ .............................................. F16K 11/00
[52] U.S. Cl. ...................................... 137/883; 137/238
[58] Field of Search ................................ 137/883, 238

[56] References Cited

U.S. PATENT DOCUMENTS

| | | | |
|---|---|---|---|
| 3,724,492 | 4/1973 | Alter | 137/597 |
| 4,129,150 | 12/1978 | Boisrerand | 137/883 X |
| 4,393,891 | 7/1983 | Smoek et al. | 137/238 |

Primary Examiner—John C. Fox
Attorney, Agent, or Firm—Allegretti & Witcoff, Ltd.

[57] ABSTRACT

Distributor for viscous fluids with a feed line and multiple discharge valves and lines, each comprising a valve housing eccentrically enlarged opposite the discharge line and a valve piston with a hat-shaped valve head surmounted by a mushroom-shaped attachment. The valve piston may be positioned with respect to the eccentrically-enlarged portion of said housing to control the flow through the gap between the valve head attachment and the enlarged portion as compared with the flow through the gap between the attachment and the housing wall on the side adjacent the discharge line.

8 Claims, 3 Drawing Sheets

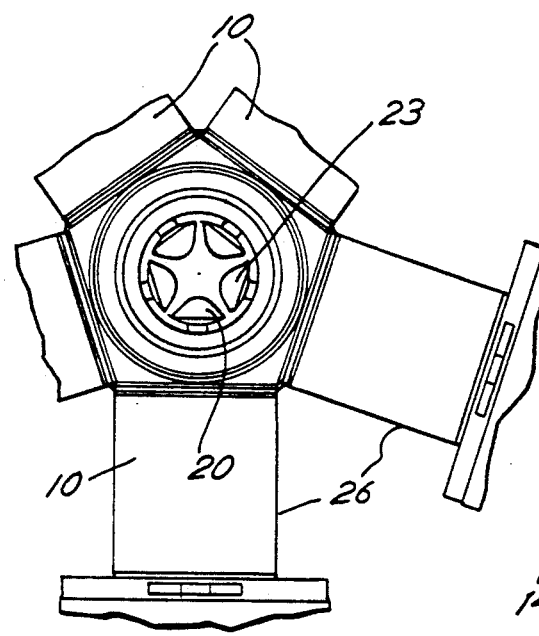
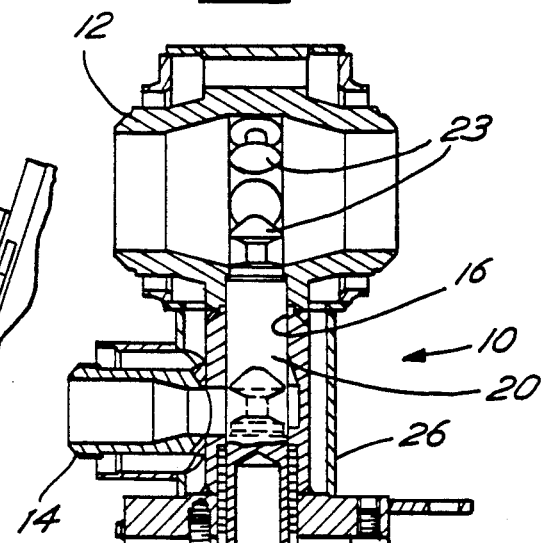
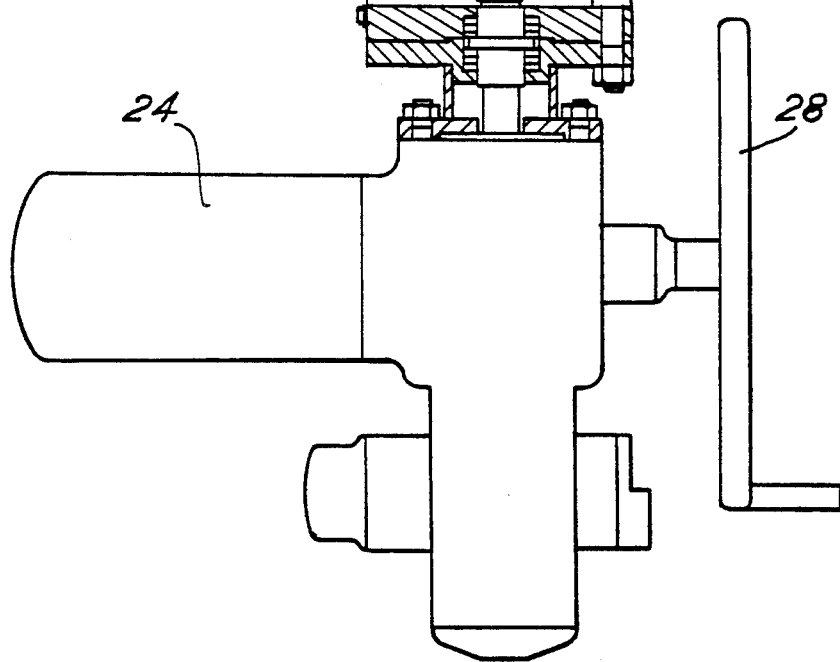

DISTRIBUTOR FOR VISCOUS FLUIDS WITH ADJUSTABLE MULTIPLE DISCHARGE

BACKGROUND OF THE INVENTION

The present invention relates to a distributor for viscous fluids comprising a feed line and multiple discharge lines containing adjustable valves. In particular, the invention relates to a multiple distributor for polymer melts to melt-spinning units or similar extrusion systems.

PRIOR ART

In the production of filaments or the like, it is necessary to distribute the polymer melt supplied through a single line from the polycondensation reactor or from chips melting equipment to a plurality of spinning units or similar extrusion systems. The polymer melt quantity feed to each of these systems must be adjustable with high precision. Further, inside the distributor, dead spaces have to be avoided because a longer residence time of parts of the polymer results at least in polymer degradation and possibly insoluble, cross-linked products.

The distributor described in U.S. Pat. No. 3,724,492 provides a closed ring conduit which permits maintaining an uninterrupted small flow of polymer melt when the valves are in the closed position. As long as the valves are closed, the same quantity of polymer is circulated in the closed ring conduit, without exchange by new product. Due to this prolonged residence time, the polymer in the closed ring conduit is subject to degradation and cross-linking and, after reopening the valves, spoils the polymer from the distributor to the spinning units. In the open position of the valves, dead spaces are not completely avoided. Intermediary valve positions corresponding to an adjusted intermediary flow velocity are difficult to set with precision.

THE INVENTION

The object of the present invention is to provide a distributor for viscous fluids with multiple discharge lines in which the disadvantages stated above are obviated or at least minimized. In particular, the distributor should have no dead spaces, neither in the closed position, nor in the open position of the valves. The polymer from the feed line flow to the discharge lines should be adjustable with precision.

These objects can be achieved, in accordance with the present invention, by a distributor with a feed line and multiple discharge valves and lines, each comprising a discharge line and disposed perpendicular to this line, a valve housing with an axially-movable valve piston. The valve housing is eccentrically enlarged to an elliptical cross section opposite the connection to said discharge line with gradual transitions between the circular cross section and the maximum elliptical cross section. The valve piston has a hat-shaped valve head surmounted by a mushroom-shaped attachment for distributing the fluid to the gap between the piston and the housing wall. The geometric dimensions of the distributor are subject to the specific relationships disclosed below.

THE DRAWINGS

The invention will be further illustrated by means of the drawings in which:

FIG. 1 is a longitudinal view, partly in section, of a valve housing, including connections to a central feed line, and a radial discharge line with the valve in the closed position (full lines) and in the open position (dotted lines).

FIG. 2 is a plan view of a portion of a distributor having multiple radial discharge lines connecting to the central feed line through the valve housings with the valves in the closed position.

DETAILED DESCRIPTION

Figure 3:
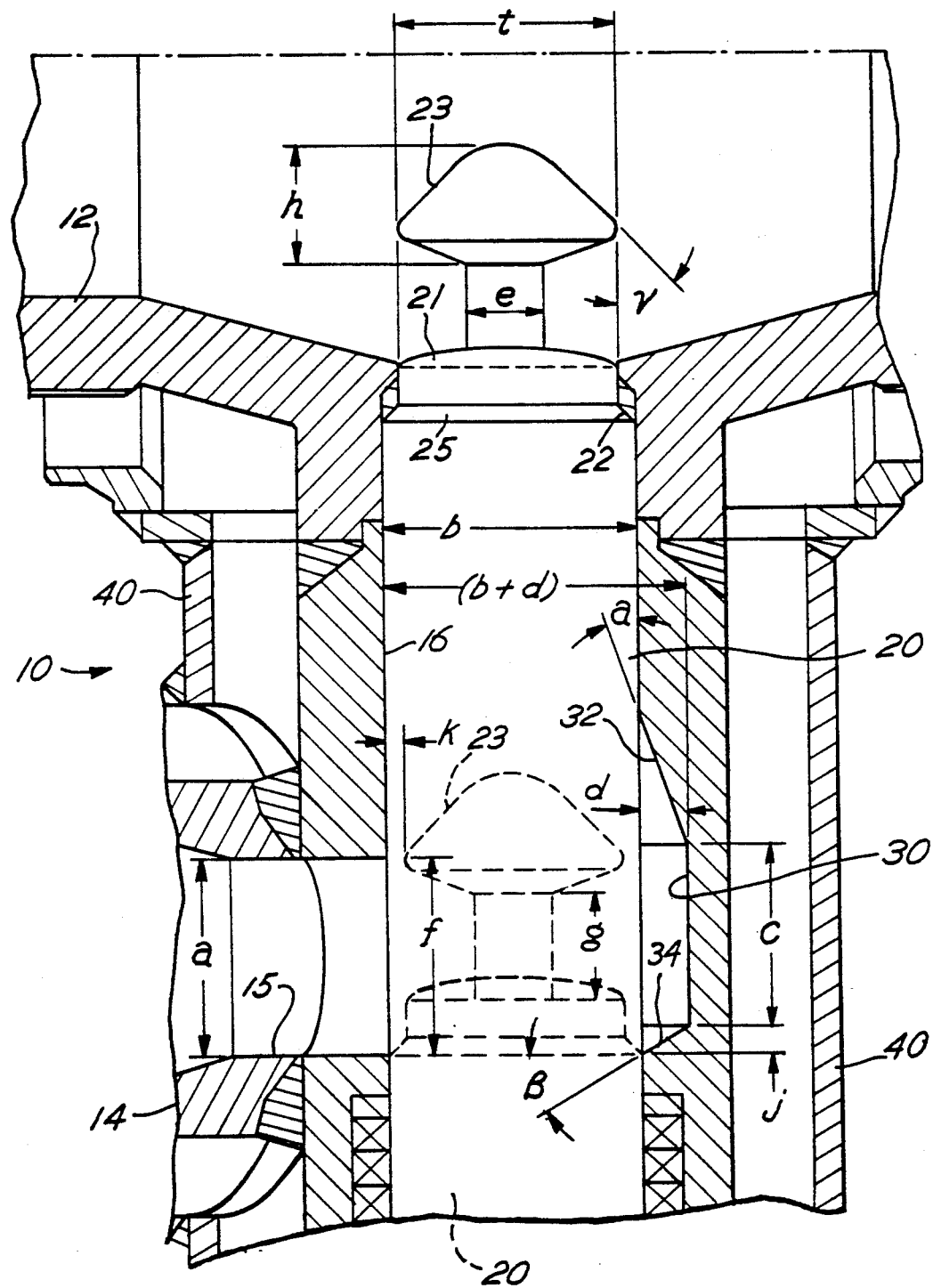
FIG. 3 is an enlarged, sectional view of the valve housing with heating jackets.

Referring to FIG. 1, valve housing indicated generally at 10 connects radially to the central feed line 12. As shown in FIG. 2, five such valve housings attach to the circumference of the central feed line. The wall of feed line 12 contains five valve seats 22, equally spaced around the circumference, which seats cooperate with pistons 20 in the valve housing 10 to close off flow from the feed line to the discharge lines 14 connecting to the valve housing. The flow from feed line 12 is radial and then turns 90° out of the plane of the paper through discharge line 14. In FIG. 1, the valve housing 10, including the discharge line 14, is purposely oriented at 90° to its actual position better to illustrate the internal parts of the valve housing. The piston 20 connects to a piston rod 18 which in turn is actuated by a drive motor 24 which moves the piston from closed to open positions within the cylinder 16. An adjusting wheel 28 serves to locate the piston 20 with respect to the valve seat 22 within the cylinder 16. The piston 20 in FIG. 1 is shown in closed on seat 22 (full lines) and in open position in dotted lines.

Referring to FIG. 3, opposite to the discharge line 14, the cylinder 16 of the valve housing is eccentrically enlarged to an elliptical cross section 30 whereby the maximum diameter b+d is maintained over an axial length c. Instead of the elliptical cross section, a slightly different shape composed of two circle segments is possible. The transition surfaces 32, 34 between the circular cross section and the maximum elliptical cross section 30 are gradual, forming with the wall of the cylinder 16 an angle $\alpha$ on the feed line end and an angle $(90° - \beta)$ on the opposite end. Preferably, the angle $\alpha$ is 20° and the angle $\beta$ is approximately 30°. The depth d of the enlarged part is equal to $(0.1 \text{ to } 0.2) \times b$, preferably approximately $0.165 \times b$. The length c corresponds approximately to $(0.8 \text{ to } 1.0) \times a$, the diameter of discharge opening 15 and preferably to $0.92 \times a$. The enlarged part 30 corresponding to the length c is located opposite the discharge opening 15, and extends just a short distance more than the diameter a on the feed line side, as indicated at 32. The transitional surface 34 corresponding to the angle $\beta$ should be small, but with a slope allowing an unhindered flow of the viscous fluid without stagnation. Instead of trapezoidal cross section illustrated, a slightly curved shape of the enlarged part 30 is possible.

The axially movable valve piston 20 is terminated by a conventional hat-shaped valve head 21, with its inclined surface 25 fitting against valve seat 22 in the feed line wall at the radial branching point. The height of the valve head is determined by the strength requirements of the valve seat and should be as small as possible.

This conventional valve head 21 is surmounted, according to the present invention, by a mushroom-shaped attachment comprising a stem and cap 23. The total height f (shown on the valve in dotted-line, open position) from the base 25 of the valve head to the cap at its maximum diameter t should be approximately equal to $(1.0 \text{ to } 1.05) \times a$ and said maximum diameter t approximately equal to $(0.75 \text{ to } 0.95) \times b$. This attachment has preferably the following shape, all values being approximate values:

| | |
|---|---|
| stem diameter | $e = 0.30 \times b$ |
| cap diameter | $t = 0.85 \times b$ |
| stem height | $g = 0.54 \times a$ |
| cap height | $h = 0.60 \times a$ | said cap 23 sloping on its top side at an angle y of 45° with the axis of cylinder 16. The sloping top side is curved at its peak and on its peripheral side.

As can be seen from FIG. 3 in the closed position of the valve, this mushroom attachment projects freely into the feed line. In the open position of the valve, as shown by dotted lines, the valve head and the attachment are located at the level of the discharge outlet 15. Although the shape of the valve head 31 and of the attachment 23 can differ somewhat from that described, angles forming dead spots, especially at the upper surface of the valve head and at the lower surface of the cap 23, have to be excluded. When the valve is open, the viscous fluid on its way from the feed line to the discharge line is distributed over the cross section of the valve cylinder 16 by the cap 23 of the piston 20. At the elliptical cross section 30 of the valve housing at the level of the discharge outlet 15, the gap between the cap 23 and the housing wall increases from the distance k on the discharge line side to the distance k+d on the opposite side. Therefore, the flow of the viscous fluid is greater at the enlarged part 30, resulting in a more intensive flushing on this side. This enhanced flushing compensates for the tendency of the fluid to stagnate on this side of cylinder 16. Depending on the size of the gaps, the ratio of the volume of the fluid flow on the side opposite the discharge outlet 15 to the volume of fluid flow on the side adjacent outlet 15 has a value in the range of 1.1 to 2.5, preferably approximately 2.0. Furthermore, this ratio and the total flow can be adjusted to intermediary values by moving the valve piston 20 upwardly in the axial direction, whereby the gap on said opposite side decreases proportional to the angle $\alpha$, that is, the distance between cap 23 and transition wall 32. This adjustment is, of course, limited by the impossibility of the fluid to escape to the discharge line when the piston 20 is moved so far upwards that it covers completely the discharge outlet 15.

The distributor according to this invention can be used for any viscous fluid, which has to be distributed selectively from a single feed line to multiple discharge lines. The gaps k and k+d are larger, as the viscosity of the fluid increases. A preferred application is the distribution of a polymer melt to a plurality of extrusion positions or melt-spinning units. Examples of such polymers are polyethylene terephthalate, polybutylene terephthalate, polyamide-6, polyamide-6.6, polyolefins and the copolymers thereof. In this case, the distributor and the polymer lines must be surrounded by one or more heating jackets 40 (FIG. 3) in which an appropriate heating medium is circulated. Other heating means, such as heating strips, can be used.

The discharge lines and valves can be arranged in any way, preferably radially to a central feed line (FIG. 2) or perpendicular, side-by-side, to the feed line. The number of discharge lines and valves connected to the feed line is limited by the circumference of the feed line for the radial arrangement and by the natural pressure drop of the fluid flowing in the feed line for the side-by-side arrangement.

Figure 4:
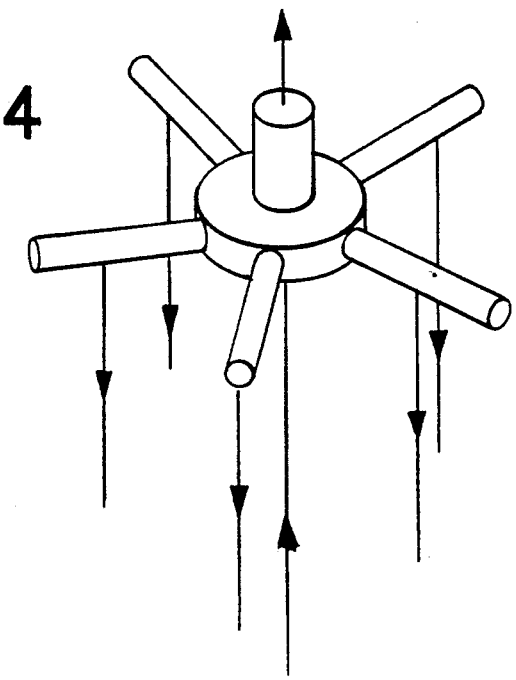
FIG. 4 is a schematic view of the flow orientation of a distributor having multiple radial discharge lines.
Figure 5:
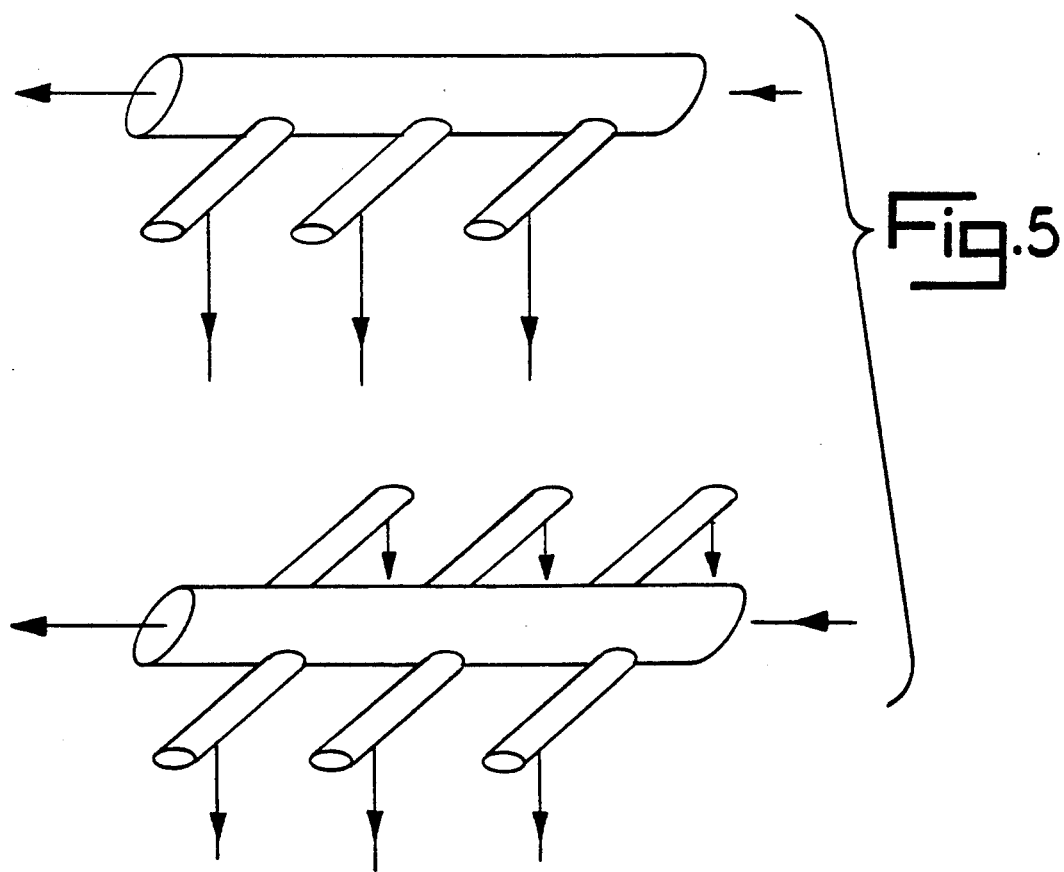
FIG. 5 is a schematic view of the flow orientation of a distributor having multiple side-by-side discharge lines.

FIGS. 4 and 5 show the flow orientation for the radial and the side-by-side arrangement, respectively. The arrows oriented downwards represents the flow in the discharge lines connected, for example, to spinning units. The thicker arrow oriented upwards, respective horizontally represents the flow in the feed line. The viscous fluid flows from its supply unit, for example, a polymerization reactor or a chips melting unit, to the connection of the discharge valves, and further via a flow regulating valve (not shown) to a collecting vessel or, in the case of polymer, a chips cutting unit.

With the discharge valves in the open position, the main part of the viscous fluid flows to the discharge lines. However, a small part (less than 20%) of the fluid flows continuously to the collecting vessel or the chips cutting unit. The residence time of this small part in the feed line is short, so it can be recycled to the supply unit or used for other applications. This continuous flow prevents the fluid to stagnate and deteriorate in the feed line section close to the discharge valves connections.

With the discharge valves in the closed position, but without interruption of the fluid supply, for example, during a temporary stop of the spinning units, the whole viscous fluid flows to the collecting unit. As a result of the valve head attachments projecting freely into the feed line, the pressure in the feed line is increased and by this, the flushing of the feed line is improved.

We claims:

1. Distributor for viscous fluids comprising a feed line, multiple valve housings connecting to said feed line, each valve housing having a cylinder, a discharge outlet connecting to a discharge line, and a valve piston movable within said cylinder from closed to open positions to control flow from said feed line to said discharge line, said distributor having the following dimensions said discharge outlet having an inside diameter a and said cylinder having a diameter b, said valve housing cylinder being eccentrically enlarged opposite said discharge outlet to an elliptical cross section, with gradual transition surfaces between the circular cross section and the maximum elliptical cross section, having a maximum diameter b+d of approximately $(1.1 \text{ to } 1.2) \times b$ and an axial length c of approximately $(0.8 \text{ to } 1.0) \times a$, said valve piston having a valve head surmounted by a mushroom-shaped attachment with stem and cap, the total height f from the base of the valve head to the cap at its maximum diameter t being approximately equal to $(1.0 \text{ to } 1.05) \times a$ and said maximum diameter t of the cap being approximately equal to $(0.75 \text{ to } 0.95) \times b$, whereby in the open position of the valve said attachment causes the fluid flow through said housing cylinder to be greater on the side opposite said discharge outlet than the flow adjacent the discharge outlet and in the closed position said valve closes off flow from said feed line.

2. Distributor for viscous fluids according to claim 1 in which said valve piston is axially adjustable to control the total flow of the viscous fluid and the ratio of the flow of the fluid on the side opposite to the discharge outlet to the flow adjacent said discharge outlet.

3. Distributor for viscous fluids according to claim 2 in which said piston valve is adjusted so that said ratio has a value in the range of 1.1 to 2.5.

4. Distributor for viscous fluids according to claim 2 in which said piston valve is adjusted so that said ratio is approximately 2.0.

5. Distributor for viscous fluids according to claim 1 in which said valve housing connects radially to a central feed line.

6. Distributor for viscous fluids according to claim 1 in which said valve housings connect perpendicularly, side by side to said feed line.

7. Distributor for viscous fluids according to claim 1 in which said valve housings are surrounded by heating means.

8. Distributor according to claim 1 whereby, in the longitudinal view, said eccentrically-enlarged cylinder of the valve housing has an irregular trapezoidal cross section with an angle $\alpha$ of approximately 20° with the axis of the cylinder on the side of the housing nearest the feed line, an angle of 60° with the axis of the cylinder on the side nearest the discharge outlet, a depth d equal to approximately $0.165 \times b$, and an axial length c equal to approximately $0.92 \times a$, and said mushroom-shaped attachment has a stem diameter e equal to approximately $0.30 \times b$, a cap diameter t equal to approximately $0.85 \times b$, a stem height g equal to approximately $0.54 \times a$, and a cap height h equal to approximately $0.60 \times a$, said cap forming on its top side an angle y of approximately 45° with the housing axis.

* * * * *